United States Patent Office 3,097,110
Patented July 9, 1963

3,097,110
ADHERING TEXTILE MATERIALS TO RUBBER
Arthur C. Danielson, Royal Oak, Mich., assignor to United States Rubber Company, New York, N.Y., a corporation of New Jersey
No Drawing. Filed Jan. 15, 1962, Ser. No. 166,378
15 Claims. (Cl. 117—162)

This invention relates to improvements in the method of adhering textile materials to rubber, and to the improved laminates so obtained.

In certain rubber articles designed to withstand considerable stresses in use, the rubber is reinforced with plies of comparatively inextensible textile materials. Rubber hose, belts and tires are commonly reinforced with textile material of fibers in the form of fibers, including staple, yarns, cords, bats, or woven or braided fabric. In such articles, it is important that the plies of textile reinforcing material be firmly adhered to the rubber intermediate the textile plies and remain effectively adhered even after the article has been subjected to repeated varying strains in use, because any separation and relative movement of the rubber and textile parts leads to abrasion between these parts and consequent early failure.

According to the present invention, there is provided an improved method for adhering textile material to rubber, for example in adhering the plies of tire cord fabric to the tire carcass stock.

In carrying out the present invention, adhesion of the textile material to the adjacent rubber is greatly improved by the use of a resinous reaction product of resorcinol and a second component which is 1,8-di(methyleneamino)-p-menthane or an azomethine having the general formula

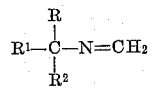

where R, R¹ and R² are alkyl having 1 to 8 carbon atoms, phenyl, benzyl or 2-phenylethyl. Examples of azomethines that may be used are t-butylazomethine, t-octylazomethine or neopentyldimethylcarbinylazomethine of the formula

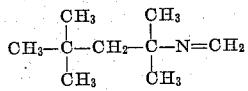

α,α - dimethylbenzylazomethine, triphenylmethylazomethine or α,α-diphenylbenzylazomethine, tribenzylmethylazomethine, tri-(2-phenylethyl)methylazomethine. The 1,8-di(methyleneamino)-p-menthane has two azomethine (—N=CH₂) groups. Reference for preparations: Hurwitz, U.S. Patent No. 2,582,128, dated January 8, 1952. Instead of the resorcinol component of the resinous reaction product, other meta disubstituted benzenes in which each of the substituents is an OH, NH₂ or OCOCH₃ radical, e.g., m-aminophenol, m-phenylene-diamine, resorcinol monoacetate, resorcinol diacetate, or 1,5-naphthalenediol, or partially reacted resorcinol-formaldehyde resin, which materials are equivalent to the resorcinol, may be used. The rubber intermediate the textile plies may be applied in the usual manner by calendering a coating of a vulcanizable rubber composition on the textile material, generally on both sides e.g. as in the conventional coating of tire cord fabric with tire carcass stock. The textile material, such as tire cord fabric, may optionally previously have applied thereto a thin coating of rubber by passing the textile material through a bath of an aqueous dispersion of rubber, such as rubber latex, and drying. This so-called "solutioning" treatment is common practice. The two components of the resin are mixed along with conventional compounding ingredients in the solid dry rubber to be calendered on the textile material. The rubber compound is then calendered onto the bare or latex treated textile material. The amount of the resin components mixed with the rubber is not critical. Generally, 0.5 to 8 parts, and preferably 1 to 4 parts of the two resin-forming components (total) per 100 parts of the rubber will be mixed in the rubber compound to be calendered on the textile material. The ratio of the two components of the resin is not critical and generally will be from 1 to 4 moles, preferably 1 to 2 moles, of the resorcinol per mole of the second component. After building the rubber-coated textile material into the finished article, e.g. a tire, the assembly is heated to vulcanize the rubber components thereof. The adhesion of the textile material to the adjacent vulcanized rubber stock is greatly improved by means of the resin formed at the vulcanizing temperature by the reaction of the resorcinol and the second component adjacent the interface of the textile material and the rubber of the laminate.

The rubber used in the present invention for making the rubber and fabric laminates for use in tire manufacture and for other purposes may be natural (Hevea) rubber or conjugated diolefine polymer synthetic rubber or mixtures of any of them including their reclaims. Such conjugated diolefine polymer synthetic rubbers are polymers of butadienes-1,3, e.g. butadiene-1,3, isoprene, 2,3-dimethylbutadiene-1,3, and mixtures thereof and polymers of mixtures of such butadienes-1,3 with up to 50% of such mixtures of compounds which contain a $CH_2=C<$ group and which are copolymerizable with butadienes-1,3, e.g. where at least one of the disconnected valences is attached to an electronegative radical, that is a radical which increases the polar character of the molecule, such as vinyl, phenyl, nitrile, carboxy radicals. Examples of such conjugated diolefine polymer synthetic rubbers are polybutadiene, polyisoprene, butadiene-styrene copolymers (SBR) and butadiene-acrylonitrile copolymers. The rubber will also contain conventional compounding and vulcanizing ingredients such as carbon black, antioxidants, sulfur, zinc oxide, accelerators, and rubber processing or softening oils which may be added as such or may be present from oil-extended rubbers. The textile material may be made of any of the conventional textiles used for reinforcing rubber, such as native cellulose (e.g. cottons), regenerated cellulose (e.g. rayons), and synthetic linear polyamides (e.g. nylons).

The following example illustrates the invention. All parts referred to herein are by weight.

A rubber compound A was prepared by milling 1.25 parts of resorcinol into a masterbatch of 100 parts of natural rubber and 20 parts of carbon black at about 110° C. After cooling, the following ingredients were mixed into the batch at about 70° C. in the following order: 10 parts of zinc oxide, 2 parts of stearic acid, 0.5 part of accelerator SNS (N-tertiary butyl-2-benzothiazole-sulfenamide), 1.0 part of antioxidant BLE (condensation product of acetone and diphenylamine), 3.5 parts of neopentyldimethylcarbinylazomethine and 3.5 parts of sulfur.

A rubber compound B was prepared in a similar manner to compound A except 2.4 parts of 1,8-di(methyleneamino)-p-menthane was used instead of the 3.5 parts of the azomethine.

A control rubber compound C was prepared in a similar manner to compound A except the resorcinol and azomethine were omitted.

The adhesion of the rubber compounds A and B containing the resin-forming components according to the present invention and the control compound C to tire cords made of bare nylon and rayon fibres was measured at 250° F. by the "H" adhesion test described in Ind. Rub.

World, vol. 114, page 213 (1946), "Study of 'H' Test for Evaluating the Adhesive Properties of Tire Cord in Natural and GR-S Rubbers," and in United States Department of Agriculture Bulletin A1C-99 (1945), by Lyons, Nelson and Conrad. In the "H" test, the cord under test coated with the rubber compound under test is embedded in two separated standard rubber blocks and the assembly vulcanized. The pounds necessary to pull the adhered cord free of one of the rubber blocks is the "H" adhesion value. The higher the figure, the better the adhesion of the rubber coating to the cord. Test pieces for the rubber compounds were vulcanized for 30 minutes at 307° F. The results are shown in the following table:

| Compound | 250° F. "H" Adhesion (lbs.) | |
|---|---|---|
| | To Nylon | To Rayon |
| A | 9.9 | 8.2 |
| B | 7.9 | 9.8 |
| C | 4.7 | 3.0 |

The above results clearly show the great improvement in adhesion of fibrous material to rubber by the present invention.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In the method of adhering textile material to rubber by applying a vulcanizable rubber coating to a textile material and heating the assembly to vulcanize the rubber, the step which comprises incorporating in at least the portion of the assembly adjacent the interface of the textile material and rubber coating before vulcanization resorcinol and a compound selected from the group consisting of 1,8-di(methyleneamino)-p-menthane and azomethines having the general formula

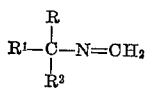

where R, $R^1$ and $R^2$ are selected from the group consisting of alkyl radicals having 1 to 8 carbon atoms, phenyl, benzyl and 2-phenylethyl.

2. A method of adhering textile material to rubber which comprises applying to textile material a solid dry vulcanizable rubber composition containing resorcinol and a compound selected from the group consisting of 1,8-di(methyleneamino)-p-menthane and azomethines having the general formula

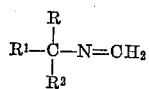

where R, $R^1$ and $R^2$ are selected from the group consisting of alkyl radicals having 1 to 8 carbon atoms, phenyl, benzyl and 2-phenylethyl, and heating the assembly to vulcanize the rubber and to firmly adhere the textile material to the rubber composition.

3. A method of adhering textile material to rubber which comprises applying to a textile material a solid dry vulcanizable rubber composition comprising rubber selected from the group consisting of natural Hevea rubber and conjugated diolefine polymer synthetic rubbers which are polymers of material selected from the group consisting of butadiene-1,3, isoprene, 2,3-dimethylbutadiene-1,3, and mixtures thereof, and mixtures of such butadienes-1,3 with up to 50% of the mixtures of compounds which contain a $CH_2=C<$ group and which are copolymerizable with butadienes-1,3, said rubber composition containing resorcinol and a compound selected from the group consisting of 1,8-di(methylene-amino)-p-menthane and azomethines having the general formula

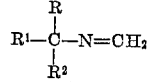

where R, $R^1$ and $R^2$ are selected from the group consisting of alkyl radicals having 1 to 8 carbon atoms, phenyl, benzyl and 2-phenylethyl, and heating the assembly to vulcanize the rubber and to firmly adhere the textile material to the vulcanized rubber composition.

4. A method of adhering textile material to rubber which comprises applying a solid dry vulcanizable rubber composition comprising rubber selected from the group consisting of natural Hevea rubber and conjugated diolefine polymer synthetic rubbers which are polymers of material selected from the group consisting of butadiene-1,3, isoprene, 2,3-dimethylbutadiene-1,3, and mixtures thereof, and mixtures of such butadienes-1,3 with up to 50% of the mixtures of compounds which contain a $CH_2=C<$ group and which are copolymerizable with butadienes-1,3, said rubber composition containing resorcinol and 1,8-di(methylene-amino)-p-menthane to a textile material selected from the group consisting of cotton, rayon and nylon to coat the same, and heating the assembly to vulcanize the rubber and to firmly adhere the textile material to the vulcanized rubber composition.

5. A method of adhering textile material to rubber which comprises applying a solid dry vulcanizable rubber composition comprising rubber selected from the group consisting of natural Hevea rubber and conjugated diolefine polymer synthetic rubbers which are polymers of material selected from the group consisting of butadiene-1,3, isoprene, 2,3-dimethylbutadiene-1,3, and mixtures thereof, and mixtures of such butadienes-1,3 with up to 50% of the mixtures of compounds which contain a $CH_2=C<$ group and which are copolymerizable with butadienes-1,3, said rubber composition containing resorcinol and neopentyldimethylcarbinylazomethine to a textile material selected from the group consisting of cotton, rayon and nylon to coat the same, and heating the assembly to vulcanize the rubber and to firmly adhere the textile material to the vulcanized rubber composition.

6. An assembly of textile material and a vulcanized rubber composition containing an in situ formed resinous reaction product of a resorcinol and a compound selected from the group consisting of 1,8-di(methyleneamino)-p-menthane and azomethines having the general formula

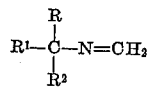

where R, $R^1$ and $R^2$ are selected from the group consisting of alkyl radicals having 1 to 8 carbon atoms, phenyl, benzl and 2-phenylethyl.

7. An assembly of textile material and a vulcanized rubber composition containing an in situ formed resinous reaction product of resorcinol and 1,8-di(methyleneamino)-p-menthane.

8. An assembly of textile material and a vulcanized rubber composition containing an in situ formed resinous reaction product of resorcinol and neopentyldimethylcarbinylazomethine.

9. A laminate of tire cord fabric and a vulcanized rubber tire carcass stock containing an in situ formed resinous reaction product of resorcinol and a compound selected from the group consisting of 1,8-di(methyleneamino)-p-menthane and azomethines having the general formula

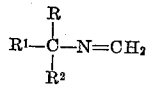

where R, $R^1$ and $R^2$ are selected from the group consisting of alkyl radicals having 1 to 8 carbon atoms, phenyl, benzyl and 2-phenylethyl.

10. A laminate of tire cord fabric and a vulcanized rubber tire carcass stock containing an in situ formed resinous reaction product of resorcinol and 1,8-di(methyleneamino)-p-menthane.

11. A laminate of tire cord fabric and a vulcanized rubber tire carcass stock containing an in situ formed resinous reaction product of resorcinol and neopentyldimethylcarbinylazomethine.

12. A rubber composition for adhering strongly to textile material when vulcanized thereto comprising a vulcanizable rubber composition containing resorcinol and a compound selected from the group consisting of 1,8-di(methyleneamino)-p-menthane and azomethines having the general formula

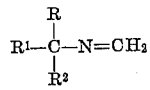

where R, R¹ and R² are selected from the group consisting of alkyl radicals having 1 to 8 carbon atoms, phenyl, benzyl and 2-phenylethyl.

13. A solid dry rubber composition for adhering strongly to textile material when vulcanized thereto comprising a vulcanizable rubber composition containing resorcinol and a compound selected from the group consisting of 1,8-di(methyleneamino)-p-menthane and azomethines having the general formula

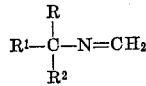

where R, R¹ and R² are selected from the group consisting of alkyl radicals having 1 to 8 carbon atoms, phenyl, benzyl and 2-phenylethyl.

14. A solid dry rubber composition for adhering strongly to textile material when vulcanized thereto comprising a vulcanizable rubber composition containing resorcinol and 1,8-di(methyleneamino)-p-menthane.

15. A solid dry rubber composition for adhering strongly to textile material when vulcanized thereto comprising a vulcanizable rubber composition containing resorcinol and neopentyldimethylcarbinylazomethine.

No references cited.